Oct. 16, 1934.                R. R. GRAVES                1,977,511
                    MILKING PROCESS AND APPARATUS
                        Filed May 23, 1929         3 Sheets-Sheet 1

Oct. 16, 1934.   R. R. GRAVES   1,977,511
MILKING PROCESS AND APPARATUS
Filed May 23, 1929   3 Sheets-Sheet 2

Inventor
Roy R. GRAVES,
By K. P. McElroy Attorney

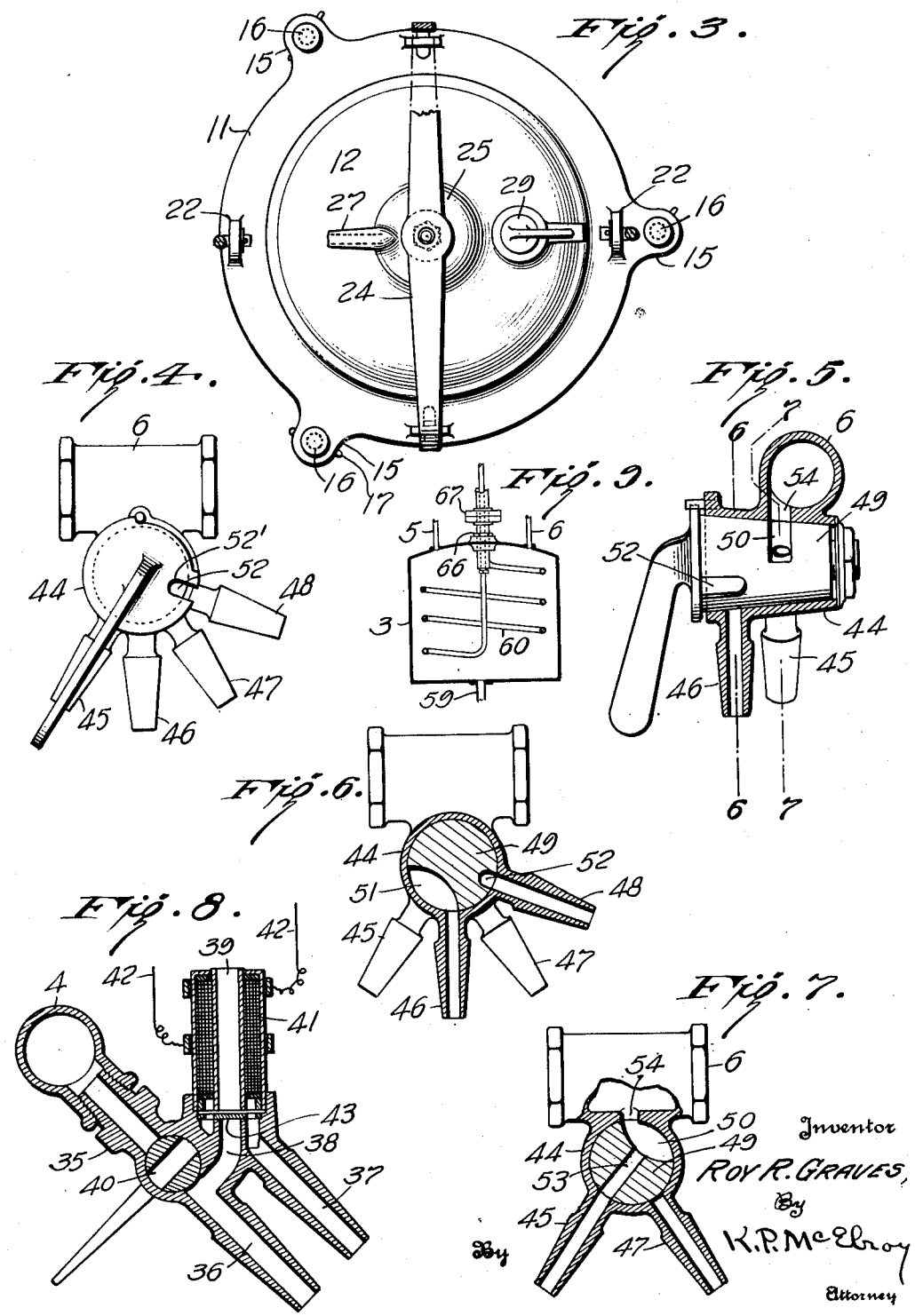

Patented Oct. 16, 1934

1,977,511

UNITED STATES PATENT OFFICE 1,977,511

MILKING PROCESS AND APPARATUS

Roy R. Graves, Kensington, Md.

Application May 23, 1929, Serial No. 365,474

4 Claims. (Cl. 31—58)

This invention relates to the measuring and examining or testing of milk; and it comprises mechanically milking a cow under aseptic conditions, transmitting the milk to further treatment or to storage, and during such transmittal of the milk, measuring and examining or removing samples for testing without removal from the system; and it also relates to apparatus for accomplishing the above; all as more fully hereinafter set forth and as claimed.

This application is a continuation in part of my prior and copending application Serial No. 226,133, filed October 14, 1927, in which I have described and claimed a method for the production of vitamin containing pasteurized milk of low bacterial content according to which the milking is performed mechanically, measured automatically and transmitted under vacuum and with exclusion of air to a pasteurizing tank or bottling machine via a receptacle wherein the milk is stored for about thirty minutes or an hour at body temperature with exclusion of air to permit germicidal action. In said application I have also shown and described a measuring and examining receptacle interposed between the milking device and the pasteurizer or the tank in which germicidal action is accomplished, the function of said receptacle being to determine the amount of milk obtained from each cow and also to visibly examine the milk to detect at a glance a gargety or bloody condition in the milk so that the milk may be diverted from the common or bulk receiver if such condition exists.

The importance of maintaining the milk under vacuum and with exclusion of air in transit from the udder to the pasteurizer or bottling machine is emphasized in my prior application referred to and the present application is directed to the method and system there disclosed of segregating, prior to transmission to the bulk receiver, the milk from each cow and measuring and visibly examining or otherwise testing the same, all in a continuous system and with minimum subjection of the milk to atmospheric conditions.

My invention is of special application to a system wherein a plurality of cows are being milked simultaneously and the milk transmitted to a common receiver in that it permits of temporary segregation of the milk from each cow for the purpose of measuring and examining or taking of samples for testing the same and enables diversion from the common receiver of such batches of milk from individual cows as are found on examination to be of inferior quality, all with minimum access to air. However, the invention is also of considerable advantage where only a single cow is being milked at a given time in that it enables the measuring and examination of the milk during transit to the pasteurizer or other treating device in a simple manner and also with minimum contact with air.

In accordance with the present invention I milk cows under aseptic conditions, using mechanical milking apparatus of the vacuum type, and transmit the milk from each cow to a separate receptacle connected into the line between the milking machine and bulk receiver and capable of isolation from the milker and receiver. The receptacle is preferably constructed of transparent material so that its contents may be visibly inspected to detect the presence of gargety or bloody condition in the milk, if such condition exists. The transparent or glass receptacle has another important use not obvious from its transparency alone. The milk can be seen splashing into the receptacle and hence the rate of milking can be judged. This enables the operator to immediately detect the point at which milk secretion stops. He may then shut down the machine or alternately may massage the udder with the teat cups still in position, being able to observe whether additional milk is obtained or not. The transparent receptacle thus eliminates the prior practice of stripping by hand and the contamination resulting therefrom. Stripping by hand was formerly necessary to prevent injury to the cow. The receptacle is also equipped with means for measuring its contents, being preferably suspended from a weighing scale. After the milk from each cow has been thus segregated in its separate receptacle, weighed and examined and found to be satisfactory, I transmit the same, by appropriate manipulation of a single valve, to the bulk receiver, pasteurizer or special insulated storage tank for maintaining the milk at body temperature as in my prior application. If on examination the milk is found to be bloody or otherwise unsatisfactory, it is diverted from the bulk receiver, pasteurizer, etc. by withdrawal from the measuring and testing receptacle. The arrangement of the receptacle and associated valves in the line from the milking machine to the bulk receiver, pasteurizer, etc. is such that the subjection of the milk to atmospheric conditions is maintained at a minimum.

Referring to the accompanying drawings for a more detailed understanding of my invention:

Fig. 3 is a top view of the receptacle, with parts broken away;

Fig. 4 is an end view of the main control valve between the milking machine and the receptacle;

Fig. 5 is a longitudinal sectional view of the control valve;

Fig. 6 is a section on the line 6—6 of Fig. 5;

Fig. 7 is a section on the line 7—7 of Fig. 5;

Fig. 8 is a sectional view of an electrically operated pulsator; and

Fig. 9 is a view of a modified construction of milk receiver, pasteurizer, or storage tank.

Figure 1:
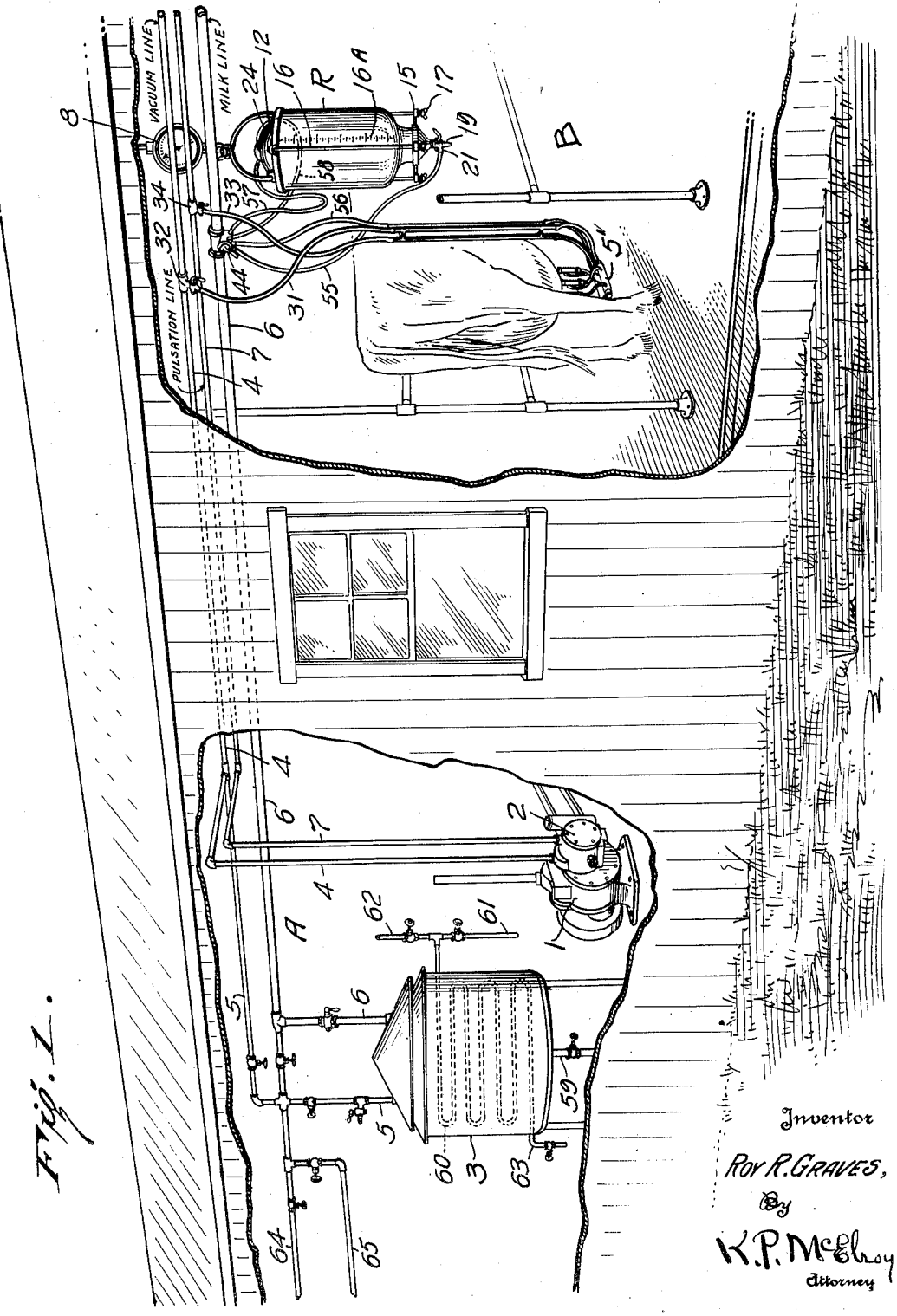
Fig. 1 is a perspective view showing part of the milking barn and receiving house.

Referring more particularly to the drawings, A is the milk receiving or pasteurizing room. The barn is divided into a number of stalls B, usually six or eight on a side, only one being shown in the drawings. In the room A are located vacuum pump 1, pulsator 2 which may be of the pneumatic or electric type, and receiver or pasteurizing tank 3 for collecting the milk from all the cows. The receiver 3 is connected to vacuum pump 1 through vacuum line 4 and branch 5 and is thus maintained under constant vacuum and is connected to the milking machine 5 in the barn by milk line 6. From the diagrammatically shown pulsator 2 extends pulsation line 7 adjacent vacuum line 4 and milk line 6.

Suspended from the weighing scales 8 between each two stalls of the barn is the measuring and examining receptacle R for temporarily segregating the milk from each cow being milked. As will be hereinafter more fully described, each receptacle R is adapted for alternate connection with the milking equipment during the milking operation and with the milk line 6 when discharging to the bulk receiver 3, the receptacle R being disconnected from line 6 during the former operation and disconnected from the milking machine equipment or teat cups during the latter operation.

Figure 2:
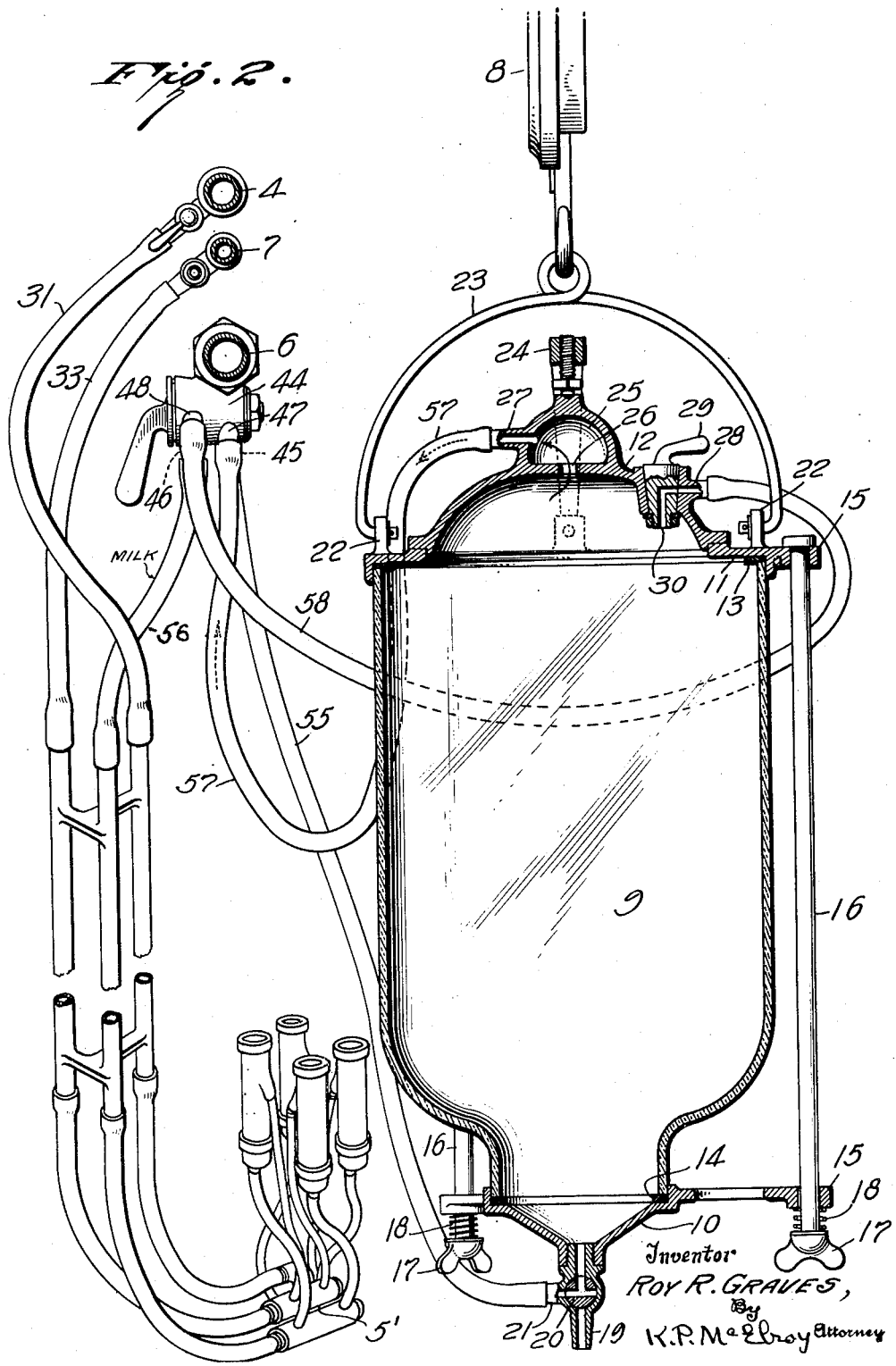
Fig. 2 is a section through the measuring and testing receptacle and shows the connections to the milking device and milk line and the connections from the vacuum and pulsation lines to the milking device.

Referring to the specific construction of the measuring and examining receptacle R as shown in Figs. 2 and 3, numeral 9 indicates a glass body portion having a conical bottom closure 10 and a top closure, the latter comprising an annular plate 11 and cover 12. Gaskets 13 and 14 are provided respectively between plate 11 and glass body portion 9 and between the latter and bottom closure 10. The closure 10 and plate 11 are each provided with flanges 15 through which extend the connecting rods 16 on the lower ends of which are threaded nuts 17. Provision is made for unequal expansion between glass and metal by means of the coil springs 18 positioned between flanges 15 of the closure 10 and nuts 17. A nozzle 19 extends into closure 10 and is provided with two-way valve 20 and nipple 21. Ears 22 on annular plate 11 serve as a means for suspending the receptacle from scales 8 by means of bail 23, and member 24 carried by plate 11 secures cover 12 in position. An air chamber 25 formed in cover 12 communicates with the interior of the receptacle through port 26 and is provided with nipple 27. A second nipple 28 carried by cover 12 communicates with the interior of the receptacle through valve 29 and the interior of the receptacle may be placed in communication with the atmosphere through port 30 and closed to nipple 28 by manipulation of valve 29. In normal milking, the valve 29 is in the position shown in Fig. 2. The receptacle R is provided with the scale 16A, graduated preferably in gallons, so that readings of the quantity of milk can be made at any time.

Milking machine 5', shown diagrammatically, is connected to vacuum line 4 through hose 31 and coupling 32 and when the pulsator is of the pneumatic type, the pulsation chamber of milking machine 5' is connected to pulsation line 7 through hose 33 and coupling 34.

In Fig. 8 I have shown an electrically operated pulsation device and connections but this construction forms no part of my invention. Referring to Fig. 8, a coupling 35 having air conduits 36, 37, 38 and 39 is secured to vacuum line 4, a valve 40 being interposed in conduit 36. An electromagnet 41 in the circuit 42 is mounted on conduit 39 of the coupling. The magnetically operating armature 43 is perforated and operates as a valve. When the circuit 42 is closed by the pulsator, valve 43 rises and connects conduit 37 with vacuum line 4 through conduits 38 and 36, the valve 40 being open. When circuit 42 is opened, valve 43 drops and communication between conduits 37 and the atmosphere is established through conduit 39. Consequently, when valve 40 is opened and vacuum pump 1 and the pulsator are set in operation, conduit 36 is under constant suction from line 4 and conduit 37 is subjected to pneumatic pulsations. If such electrical pulsator is employed, conduits 36 and 37 are connected to the hose 31 and 33 respectively which are in turn appropriately connected to the conventionally shown milking machine 5'.

Referring now to Figs. 4 to 7, there is here shown the main control valve for alternately connecting the measuring and examining receptacle R with milking device 5' and milk line 6 leading to tank 3. The specific construction of this control valve per se forms no part of my invention. The device comprises a valve casing 44 coupled into the milk line 6 as shown and carrying nipples 45, 46, 47 and 48. Turnable in valve casing 44 is a plug valve 49 having channels 50, 51, 52 and 53. The valve casing 44 communicates with milk line 6 through port 54 and channel 50 is always open to this port 54. Channel 52 communicates with the atmosphere through openings 52' in the valve casing.

Referring to Fig. 2, the association of the control valve with the milking device and measuring and examining receptacle is as follows:

Nipple 45 is connected with nipple 21 at the lower portion of receptacle R through hose 55. The valve 20 being in the position shown in Fig. 2 during the normal milking operation, the nipple 45 is therefore in open communication with the bottom of the receptacle. Nipple 46 connects with milking device 5' through hose 56; nipple 47 connects through hose 57 with nipple 27 of air chamber 25 on cover 12; and nipple 48 connects through hose 58 with nipple 28 on receptacle cover 12. As stated, valve 29 is in the position shown in Fig. 2 during the normal milking operation so that nipple 48 is in open communication with the interior of the receptacle but the receptacle may be opened to the atmosphere through port 30 and closed to nipple 28 by manipulation of valve 29.

Referring now to the operation of the control valve whereby receptacle R is alternately connected to milking device 5' and milk line 6, it will be seen when valve 49 has been turned to the left hand position of Figs. 4, 6 and 7 channel 50 is open to nipple 45 through channel 53 thereby placing the bottom of the receptacle in communication with milk line 6 through nipple 21, hose 55, nipple 45, channels 53 and 50, and port 54. At the same time channel 52, which communicates with the atmosphere through opening 52' in valve casing 44 as shown in Fig. 4, is open to nipple 48 so that the top of the receptacle is open to the atmosphere through nipple 28, hose 58, nipple 48, channel 52 and opening 52'. Consequently, the contents of receptacle R, being under atmospheric pressure, will be forced out through 21, 55, 45, 53, 50 and 54 to milk line 6 and receiver 3 which is constantly under vacuum from pump 1. The position of valve 49 as just described is the normal position after the milking has been completed and while the milk collected in receptacle R is being discharged to receiver 3.

After the receptacle has been emptied as above and in order to again establish connection with milking machine 5', valve 49 is turned to the right until the valve handle is in line with nipple 47. In this position, channel 50 is open to nipple 47 through channel 53 and channel 51 bridges nipples 46 and 48. Nipple 47 being in communication with nipple 27 through hose 57, the air is exhausted from the top of the receptacle through nipple 27, hose 57, nipple 47, channels 53 and 50 and port 54 to milk line 6. At the same time, milk flows from milking machine 5' through hose 56, nipple 46, channel 51, nipple 48, hose 58, nipple 28, and valve 29 into the interior of the receptacle and this connection is maintained until the milking has been completed. With the valve positioned as just described, the milk remains in the receptacle since the outflow connection to milk line 6, that is, nipple 21, hose 55 and nipple 45, has been cut off at the valve by rotation of plug 49 into the right hand position just described.

After the milking has been completed, valve 49 is turned to an intermediate position, that is, to a position approximately midway between the left and right positions above described. In such midway position, valve 49 disconnects nipple 47, hose 57, and nipple 27 from the source of suction and closes communication between nipples 46 and 48 so that connection is cut off between the milking machine 5' and receptacle R and the suction established in the top of the receptacle is maintained and there is no outflow of milk from the receptacle through nipple 21. The position of the valve just described is thus a neutral position since there is neither admission to nor discharge from the receptacle.

While the valve is in the neutral position, the milk collected in receptacle R may be visibly examined through glass body portion 9 for gargety or bloody condition and the contents may be measured by means of the scale 16ᴬ etched on the receptacle as shown in Fig. 1, or the weight as indicated on scales 8 noted to ascertain the yield from each cow. If the milk is found to contain blood or other visible impurities, it should not be transmitted to the bulk receiver and may be diverted therefrom by withdrawal through nozzle 19. For this purpose valve 20 is turned to establish communication between nozzle 19 and the interior of the receptacle and to simultaneously close communication between nipple 21 and the interior of the receptacle. Valve 29 is also turned to close nipple 28 to the interior of the receptacle and open the latter to the atmosphere through port 30, the milk being now forced out through nozzle 19 by its weight.

The operation of valves 19 and 29 as just described also enables withdrawal of a sample of the milk for testing otherwise than by visible examination prior to discharging the milk to the bulk receiver.

The receiving tank 3 shown in Fig. 1 is provided with valves, milk discharge pipe 59 and is equipped with heating and cooling coil 60 having valved water and steam inlets 61 and 62 and valved outlet 63. In the receiver 3, the milk may be stored for a relatively short period at body temperature as in my prior application referred to or pasteurized, or both. Preferably alternate tanks are provided so that treatment may be performed in one while the other is being filled.

Valved water and steam lines 64 and 65 are connected, as shown, with receiver 3 and milk line 6 to enable cleaning of the milk receiver as well as the milk lines, the measuring and examining receptacle, and the milking machine. By proper manipulation of valves, receiver 3 may be disconnected from the rest of the system and independently flushed out with water and steam. By establishing communication between receiver 3 and receptacle R through control valve 49 as above described, these elements and their connecting lines may be flushed out in series, or by disconnecting receiver 3 from milk line 6, the measuring and examining receptacle may be independently cleaned. Likewise, milking machine 5' may be connected into the system by manipulation of valve 49 as above described and flushed out, the flushing fluid issuing from the teat cups. In the preferred method of cleaning, the system is first flushed out with cold water, then with hot water, and finally blown with steam.

In Fig. 9 I have shown a modified form of receiving tank in which the heating and cooling coil 60 is mounted for rotation in stuffing box 66 and rotated through pulley 67. This construction is desirable where the milk is to be agitated.

As an alternative, the receiver 3 may take the form of a sealed transportable container for delivering the milk from all the cows to the factory or distributor and may be adapted for this purpose by a detachable connection to the milk line and vacuum pump. The container may be mounted on a motor truck or other conveyance and by its use, milk may be collected at different points and transported to a common pasteurizer, bottling machine, etc., all without access to air.

From the foregoing it will be seen that I have devised a simple and efficient method and system for separately measuring and examining or testing milk from each of several cows while the milk is in transit from the udder to a bulk receiver and according to which the subjection of the milk to atmospheric conditions is maintained at a minimum.

What I claim is:

1. In the mechanical milking of cows by apparatus of the vacuum type, the process which comprises delivering the milk from a milker into a receptacle, collecting all the milk from a cow, including the strippings in said receptacle and examining the milk and determining its quantity while in said receptacle, thereafter discharging the milk from said receptacle into a bulk receiver and treating it within said bulk receiver, all steps of the process being conducted under vacuum conditions.

2. In the mechanical milking of a plurality of cows simultaneously by apparatus of the vacuum type, the process which comprises delivering the milk from a plurality of milkers into a corresponding plurality of receptacles, collecting all the milk from each cow, including the strippings, separately in said receptacles and examining the milk and determining its quantity while in said receptacles, thereafter discharging the milk from said receptacles into a bulk receiver and pasteurizing it within said bulk receiver, all steps of the process being conducted under vacuum conditions.

3. In a cyclic process of mechanically milking a plurality of cows simultaneously by apparatus of the vacuum type, the process which comprises delivering the milk from a plurality of milkers into a corresponding plurality of receptacles, collecting all the milk from each cow, including the strippings, separately in said receptacles and examining the milk and determining its quantity while in said receptacles, discharging the milk from said receptacles into a bulk receiver and treating it within said bulk receiver, all steps of the process being conducted under vacuum conditions; thereafter cleaning and sterilizing the complete equipment, including milk lines, by flushing first cold water, then hot water and finally steam through all parts of the apparatus in series without dismantling the same, whereby the equipment is cleaned ready for a repetition of the cycle.

4. In combination, a plurality of milking machines, a corresponding plurality of transparent receptacles connected therewith for receiving the milk from cows individually, a bulk receiver communicating with said plurality of receptacles, means within said bulk receiver for pasteurizing and cooling the milk, means for maintaining vacuum within the said receptacles and the said bulk receiver, means for releasing the vacuum within the said receptacles individually and for simultaneously establishing communication between the bottom of said receptacles and the said bulk receiver and means connected to the equipment for flushing cold water, hot water and steam through the complete equipment, including milk lines, in series without dismantling the same.

ROY R. GRAVES.